United States Patent Office 2,693,486
Patented Nov. 2, 1954

2,693,486

PREPARATION OF PURIFIED PETROLEUM SULFONATES

Hertsell S. Conway, Munster, Ind., assignor to Standard Oil Company, Chicago, Ill., a corporation of Indiana No Drawing. Application October 25, 1950,
Serial No. 192,155

8 Claims. (Cl. 260—504)

This application relates to the preparation of purified and substantially salt-free petroleum sulfonic acids. It relates, more particularly, to the preparation of salt-free mahogany soaps, i. e., of preferentially oil-soluble salts of petroleum sulfonic acids. The invention has further reference to the preparation of salt-free petroleum sulfonates having selected cations.

In the preparation of lubricating oils, transformer oils and white oils, a common reagent for the removal of naphthenes, aromatic compounds and unsaturates is sulfuric acid. An insoluble tar-like acid sludge is formed by such treatment and is separated from the oils. Oil-soluble sulfonic acids are also formed and are usually neutralized with caustic and are separated by washing the oils with aqueous solutions of water-soluble organic compounds, usually alcohol, that are insoluble in the oils. The so-separated preferentially oil-soluble petroleum sulfonates recovered by this process contain from about 15 to 35 carbon atoms per molecule and are termed "mahogany soap;" they are contaminated with inorganic salts and free acid or base. The well known and extensive utility of refined petroleum sulfonates as, for example, lubricating oil additives and the like, renders important the removal of the aforesaid contaminates. The removal of contaminating salts from these petroleum sulfonic acids is known to be a difficult problem, cf. Sperling, Ind. Eng. Chem. Vol. 40, p. 891 (May 1948). In the past, prolonged and expensive procedures have been employed to remove the contaminating inorganic salts and have involved such steps as neutralization and subsequent air blowing over periods of many hours, and have uniformly resulted in the loss of a substantial proportion of the desired petroleum sulfonate. Furthermore, the provision of specific petroleum sulfonates such as the calcium petroleum sulfonate, has required double decomposition steps which form additional quantities of inorganic salts that again must be removed by complex refining procedures incurring additional loss of sulfonates.

A primary object of the present invention is, therefore, the provision of a simple and direct method of refining extracts of petroleum sulfonates or petroleum sulfonic acids that are contaminated with inorganic salts and acids or bases. A further object of the invention is the provision of a process for preparing salt-free mahogany soap. Yet another object of this invention is the provision of an improved process for the preparation of specific salt-free petroleum sulfonates such as the calcium, magnesium, potassium, lithium and barium petroleum sulfonates. The invention has as further objects such other advantages or results as may be found to obtain in the specification and claims hereinafter made.

It has been found that the extracts of mahogany soaps can be treated with ion exchange resins for the removal of only contaminating inorganic anions and to convert the petroleum sulfonates to salts of specifically desired cations. An essential element of this development has been the discovery that the sulfonic anions present in mahogany soaps and containing, as aforesaid, from about 15 to 35 carbon atoms per molecule, are not amenable to exchange by anion exchange resins intended for inorganic ions and that, consequently, inorganic anions and particularly the sulfate ion, can be preferentially removed from the said extracts of petroleum sulfonates by the employment of commercially available anion exchange resins. It has also been found that sulfonic acids are not bound by the usual acid-binding resins. The utilization of ion exchange resins inherently accomplishes the neutralization of excess acid or base without the concomitant formation of inorganic salts, and consequently, provides a direct means of forming neutral petroleum sulfonates uncontaminated with the said salts.

The order of treatment of the crude mahogany soaps is not critical. For example, an anion exchange resin in the hydroxyl form can first be employed to convert sodium sulfate to sodium hydroxide or a cation exchange resin in the hydrogen form can be first employed to convert free alkali to water. In the same manner, the crude soaps can be treated at one time with mixed ionic exchange resins. It is observed, however, that the fundamental contribution of this invention is the treatment of the crude mahogany soap with an anion exchange resin which substantially completely removes sodium sulfate from the crude mixture and surprisingly does not affect the petroleum sulfonates except to solve the difficult problem of accomplishing the last stages of salt removal. These anion exchange resins are synthetic hydroxyl form resins having a high capacity; natural anion exchange resins are uniformly unsatisfactory as they exhibit very low capacities.

Further employment of cation exchange resins permits direct and simple preparation of useful, specific petroleum sulfonates. A cation exchange resin that is specifically well adapted to the removal of contaminating salts from mahogany soap is a resin of the phenol formaldehyde type having nuclear carboxylic radicals. These resins effect exchange only with stronger alkalies and will leave mahogany soap unchanged. Resins of this type can also be pretreated by buffer solutions so as to permit their employment where a final treated solution of fixed pH is required.

In operation, according to the process of the present invention, petroleum oils are treated with sulfuric acids and a preferentially oil soluble mixture of sulfonic acid bodies is formed. These sulfonic acids, usually termed mahogany acids, are preferably neutralized with caustic alkali. The so-formed mahogany soap is then extracted with an alcohol or an aqueous solution of an alcohol or other oxygenated organic compounds substantially immiscible in oil at ordinary temperatures, by selectively dissolving the said mahogany soap and any adventitiously present inorganic salts and free acid or alkali.

The so-formed extracts of mahogany soap can be diluted with further quantities of alcohol or like oxygenated solvents such as dioxane so as to reduce the viscosity of the said extract and render the same more susceptible to treatment with exchange resins. The diluted extract of mahogany soap can then be brought into contact with the cation-exchange resin having nuclear carboxylic radials whereby the contained excess sodium hydroxide is converted to water and an aqueous alcoholic solution of neutral sodium sulfonate and sodium sulfate is prepared. This resin does not function below a pH of 6 and hence will not affect these neutral salts.

The treated solution is withdrawn from contact with said carboxylic cation exchange resin and is brought into contact with an anion exchange resin in hydroxyl form to remove the sulfate anions and convert the sodium sulfate to a free alkali. In many instances the amount of contaminating sulfate will not be high enough in the crude mahogany soap to produce more than about 0.5% of total free alkali by the said contact with anion exchange resin. In these cases the minor amount of alkali should not be removed as it is effective to stabilize the petroleum sulfanates. If larger amounts of free alkali are present, the aqueous alcoholic solution of sulfonates and alkali should be returned to contact with the bed of carboxylic cation exchange resin which will convert the free alkali to water.

The foregoing procedure is preferred particularly because less dilution of the crude mahogany soap is required; the said carboxylic cation exchange resin is operable in solutions having a pH as high as 14 whereas anion exchange resins of the type above employed are not efficient above a pH of about 10. Thus it has been frequently found preferable to reduce the free acidity or alkalinity of the extract to less than about 0.1 equivalents per liter before treating the crude extract initially with anion exchange resins.

In a procedure initially employing an anion-exchange resin, the diluted mahogany soap containing also inorganic sulfates is brought into contact with anion exchange resin, in hydroxyl form, in sufficient quantity to effect exchange of all contaminating anions, particularly sulfates, and preferably at temperatures below about 100° C. Contacting methods such as percolating through the resin contained in a tower or soaking in a batch vessel are employed. Usually the soap solution is percolated through a resin bed at a rate of about 30 milliliters per minute per 100 grams, although higher rates can be employed especially with cation exchange resins when rates as high as 400 milliliters per minute per 100 grams can be successfully employed. The withdrawn extract then consists of the mahogany soap, free of salt but containing a base corresponding to the cation associated in the crude mahogany soap and usually of sodium hydroxide. In many instances the presence of minor amounts of free alkali acts to stabilize petroleum sulfonates, and consequently, in such cases the only remaining required step is the removal of solvent which can readily be evaporated from the reaction products.

Free alkali is removed from the mahogany soap by treating the so-produced salt-free soap with cation exchange resin of the hydrogen type whereby the soap is converted to mahogany acids and the alkali to water. The mahogany acids can then be carefully neutralized with dilute caustic to form again the said soap preferably but not necessarily before removal of the solvent. The acids can also be neutralized with aqueous solutions of other bases when it is desired to prepare, for example, calcium, barium, or magnesium petroleum sulfonates.

However, these petroleum sulfonates having other cations can be prepared directly from salt-free mahogany soap and with avoidance of salt solubility problems by employment here again of cation-exchange resins. The salt-free mahogany soap in a solvent is flowed into contact with a selected cation exchange resin, whereby the petroleum sulfonate or mahogany acid is converted to, for example, calcium, lithium, barium, potassium, magnesium or guanidinium petroleum sulfonates. The concentration of the said solvent is not critical although it is preferred that the solvent contain some water so as to provide a good ionization medium and thus accelerate ion exchange. Effective solvents for the mahogany soap are 60% aqueous solutions of ethanol, 85% propanol, 85% dioxane or other oxygenated hydrocarbons.

Examples of cation exchange resins useful in the present process are those prepared according to the teachings of U. S. Patents 2,204,539 and 2,228,159. Anion exchange resins that are effective in the removal of sulfate ions and the like from solutions of petroleum sulfonates can be prepared according to the teachings of U. S. Patents 2,104,501 and 2,191,853.

The ion exchange resins can be regenerated by simple methods well known to the art. For example, the hydrogen cation exchange resins can be regenerated by washing them with an aqueous solution of sulfuric acid; the hydroxyl form of the anion exchange resin can be regenerated with a solution of caustic; and the other cation exchange resins can be regenerated by washing the same with a solution of a salt containing the specific cation. These regenerations can be performed either in an aqueous or a hydrocarbon or a non-aqueous medium.

The determination of the exact chemical nature of oil soluble petroleum sulfonic acid has never successfully accomplished due primarily to the complexity of petroleum, and consequently of its sulfonic acid derivatives. Furthermore, several variables enter into the production of sulfonic acid by treating petroleum fractions with sulfuric acid and these must be controlled in accordance with practice established by experience over a number of years in order to provide a relatively uniform product. Such variables include the source of the crude petroleum, since it determines the predominant chemical nature of the oil, i. e., paraffinic, naphthenic, or aromatic, the strength of the sulfuric acid, temperature of the sulfuric acid, manner of treatment etc. The alkali petroleum sulfonates are classified arbitrarily, in the absence of available chemical analyses, according to their relative solubility in oil and water. For example, a Mahogany B soap may be prepared by treating a fraction of Mid-Continent crude having a viscosity of 350 seconds Saybolt Universal with from 3 to 6 pounds of 104.5% sulfuric acid per gallon of oil, neutralizing with caustic and extracting the treated oil with 50% to 80% ethyl alcohol at 150–170° F. using a ratio of approximately 1 volume of dilute alcohol with each 4 volumes of oil. A Mahogany A soap is prepared in a similar manner, but a different fraction of Mid-Continent crude and a different amount of sulfuric acid are used.

*Example 1*

A crude mahogany soap was found to obtain from 5% to 20% of inorganic salts chiefly as sodium sulfate or sodium sulfite. An attempt was made to lower the salt content of such a mahogany soap by the conventional method of settling the salt from an alcoholic solution of soap. It was found that this lowered the salt content to about 0.5% by weight and that this remaining salt could not be removed by the conventional methods.

A solution of crude soap and alcohol was formed by dissolving 200 grams of crude sodium mahogany soap, consisting of 50.8% soap, 21.5% oil, 2.6% salts, 2.0% NaOH and 20.9% water, in 400 cc. of 95% ethyl alcohol. The alcohol was heated and stirred during the admixture of the soap. Upon cooling to room temperature, a salt layer was settled out along with a small amount of the soap. A clear solution that had a pH of 12 was decanted through a mixed ionic exchange bed consisting of 50 grams of an oil- and water-insoluble resin having nuclear sulfonic radicals and 50 grams of an oil- and water-insoluble acid-binding resin having nuclear amine radicals. The first 586 cc. of effluent soap solution was found to have a pH of 2 at the beginning of flow from the exchanger and a pH of 8 at the end; the free sulfonic acid contained therein was neutralized with 3.9 grams of sodium hydroxide. The alcohol was evaporated from the solution and a yield of 93 grams of soap was obtained from this cut. The next 250 cc. of effluent soap solution had a pH between 8 and 9 and this solution was evaporated, whereby 50 grams of salt-free sodium petroleum sulfonate was obtained. The first said cut yielded sulfonate having only 0.004% by weight of contaminating salts; the second cut was found to contain 0.007% by weight of contaminating salts.

*Example 2*

A solution of 4 parts by weight of calcium mahogany soap, containing about 4.2% by weight calcium, in about 200 parts by weight of 85% dioxane and 15% water was treated with about 40 parts by weight of a sodium cation exchange resin consisting of a substantially water- and oil-insoluble sulfonated polystyrene having a nuclear sulfonate radical. The solution was percolated through a bed of the resin at a rate of about 30 milliliters per minute per 100 grams of resin. Evaporation of the effluent solution yielded about 4 parts by weight of sodium B mahogany soap containing less than 0.1% calcium.

*Example 3*

A solution containing about 5 parts by weight of calcium mahogany soap in about 50 parts by weight of 85% dioxane and 15% water was passed through a column containing about 40 parts by weight of a substantially oil- and water-insoluble hydrogen-form ion exchange resin. Evaporation of the effluent solution provided about 4.5 parts by weight of mahogany acid. Analysis of the feed stock, namely the calcium B mahogany soap by ashing showed a 12% sulfated ash. Ashing of the product resulted in a less than 0.1% sulfated ash.

*Example 4*

A mahogany soap purified by conventional means, consisted of 72.4% soap, 24.1% oil, 0.6% salts, 2.8% water and 0.1% NaOH. A solution of 5 parts by weight of this soap-oil mixture in 50 parts by weight of 85% dioxane, 15% water, was passed through a column containing about 15 parts by weight of a substantially oil- and water-insoluble hydroxyl form anion exchange resin (e. g. Amberlite IRA–400). Evaporation of the effluent solution yielded about 5 parts by weight of mahogany soap-oil mixture containing by analysis 0.01% of contaminating salts consisting mostly of sodium sulfate.

Employment of a mixed bed of both cation and anion exchange resins, as is demonstrated in Example 1, provides improved results especially when the extent of ionization is relatively low. The mixed resins, by extracting both cations and anions simultaneously cause a continued and further ionization of contaminating salts while the soap solution is flowing through the mixed bed. Thus simultaneous and extremely thorough desalting of the mahogany soap is obtained.

In the following claims, the term "petroleum sulfonates" includes petroleum sulfonic acids which may be considered to be hydrogen petroleum sulfonates and which can be obtained by alcoholic extraction of acid-treated oils without a prior neutralization, and in such cases are termed "sour extracts."

Having described my invention, I claim:

1. The preparation of purified sulfonated materials from oil-soluble sulfonated petroleum oil constituents having from 15 to 35 carbon atoms per molecule, which preparation comprises dissolving such sulfonated constituents containing a substantial amount of a contaminating anion in a solvent selected from the group consisting of alcohols and dioxane, bringing the solution into contact with an effective amount of oil- and water-insoluble hydroxyl form anion-exchange agent whereby substantially all of said contaminating anion is removed from solution by the anion exchange agent, separating the contacted solution from the agent and removing solvent from so-purified sulfonated material.

2. The process of claim 1 wherein the solution of sulfonated constituents is also contacted with an effective amount of an oil- and water-insoluble cation-exchange agent whereby substantially all of a contaminating cation present in said solution is removed from solution by said cation exchange agent.

3. The process of claim 1 wherein the solution of sulfonated constituents is also contacted with an effective amount of an oil- and water-insoluble hydrogen form cation-exchange agent whereby substantially all of a contaminating cation present in said solution is removed from solution by said cation exchange agent.

4. The process of claim 1 wherein the solution of sulfonated constituents is contacted also with an effective amount of an oil- and water-insoluble cation-exchange resin in which the cation is selected from the group consisting of sodium, potassium, lithium, barium, calcium, magnesium and guanadinium whereby substantially all of a contaminating cation present in said solution is removed from solution by said cation exchange agent.

5. A process of purifying and stabilizing alkali-metal sulfonates having about 15 to 35 carbon atoms per molecule, derived from the acid treatment of petroleum oils and containing more than 0.5% of alkali-metal sulfate as a contaminant, which method comprises contacting the sulfate-containing alkali-metal sulfonate in diluted form with an oil- and water-insoluble hydroxyl form anion-exchange resin in an amout sufficient to convert substantially completely the alkali-metal sulfate to alkali-metal hydroxide, and contacting the said alkali-metal sulfonate in diluted form with an oil- and water-insoluble hydrogen form cation-exchange resin of the phenol formaldehyde type having nuclear carboxylic radicals in an amount sufficient only to remove a part of the alkali-metal hydroxide and retain an amount of alkali-metal hydroxide not substantially greater than 0.5% by weight of the sulfonate.

6. The purification of alkali-metal petroleum sulfonates having from about 15 to 35 carbon atoms per molecule and containing inorganic-salt contaminants including alkali-metal sulfate and free alkali comprising the steps of dissolving the said petroleum sulfonates in a solvent consisting at least in part of an oil-immiscible oxygenated hydrocarbon selected from the group consisting of alcohols and dioxane, bringing the solution into contact with an oil- and water-insoluble hydrogen-form cation exchange resin having nuclear acid radicals substantially equivalent in strength to carboxylic acid radicals, and with an oil- and water-insoluble anion exchange agent, in hydroxyl form, maintaining the said contact for a sufficient time to convert the free alkali to water and anions of the said contaminating inorganic salts to hydroxyl ions, withdrawing salt-free solution of petroleum sulfonate and evaporating the said solvent therefrom.

7. The process of claim 6 in which the said anion and cation exchange resins are mixed together and are simultaneously brought into contact with the said solution of alkali-metal petroleum sulfonates.

8. A process of preparing salt-free petroleum sulfonates having a selected base-forming cation, the said process comprising admixing a concentrated sulfuric acid and a petroleum hydrocarbon containing sulfonatable constituents, sulfonating said constituents and providing a preferentially oil-soluble product consisting essentially of crude sulfonic acids having from about 15 to 35 carbon atoms per molecule, extracting the said crude sulfonic-acids from the oil into a solvent comprising an oil-immiscible alcohol and a minor proportion of water, flowing the extracted crude sulfonic solution into contact with an effective quantity of a water- and oil-insoluble anion exchange resin, in hydroxyl form, to convert contaminating inorganic acids to water, flowing the sulfonate solution into contact with an effective quantity of an oil- and water-insoluble cation exchange resin in which the cation is selected from the group consisting of sodium, potassium, lithium, barium, calcium, magnesium and guanidinium, maintaining the solution in contact with the said resin for a sufficient time to convert the petroleum sulfonate to a petroleum sulfonate of the said selected cation, withdrawing the so-treated solution and evaporating the said solvent therefrom.

References Cited in the file of this patent
UNITED STATES PATENTS

| Number | Name | Date |
|---|---|---|
| 2,275,210 | Urbain et al. | Mar. 3, 1942 |
| 2,415,558 | Hesler et al. | Feb. 11, 1947 |
| 2,470,500 | Lawrence | May 17, 1949 |
| 2,497,152 | Cohen | Feb. 14, 1950 |

OTHER REFERENCES

Myers et al., "Industrial and Engineering Chemistry," vol. 33, No. 6, pages 697–706 (1941).

Kunin et al., "Ion Exchange Resins" (Wiley and Sons) 1950, pages 38–44 and 64–69.